(12) United States Patent
Cern et al.

(10) Patent No.: US 7,215,233 B2
(45) Date of Patent: May 8, 2007

(54) INDUCTIVE COUPLER FOR POWER LINE COMMUNICATIONS

(75) Inventors: Yehuda Cern, Brookline, MA (US); Erik S. Merck, Sharon, MA (US)

(73) Assignee: Ambient Corporation, Newton, MA (US)

( * ) Notice: Subject to any disclaimer, the term of this patent is extended or adjusted under 35 U.S.C. 154(b) by 0 days.

(21) Appl. No.: 11/445,763

(22) Filed: Jun. 2, 2006

(65) Prior Publication Data

US 2006/0261920 A1 Nov. 23, 2006

Related U.S. Application Data

(62) Division of application No. 11/133,671, filed on May 20, 2005, now Pat. No. 7,078,996.

(51) Int. Cl.
*H01F 17/06* (2006.01)

(52) U.S. Cl. ..................................................... 336/175

(58) Field of Classification Search .................. 336/65, 336/83, 174–175, 219, 225, 229
See application file for complete search history.

(56) References Cited

U.S. PATENT DOCUMENTS

| 2,920,297 A | * | 1/1960 | Spicer ......................... 336/174 |
| 3,380,009 A | | 4/1968 | Miller |
| 3,683,302 A | * | 8/1972 | Butler et al. ................... 336/83 |
| 4,320,337 A | | 3/1982 | Hartmann et al. |
| 4,338,657 A | * | 7/1982 | Lisin et al. .................... 363/68 |
| 4,513,274 A | * | 4/1985 | Halder ......................... 336/173 |
| 4,775,849 A | | 10/1988 | Lucas |
| 5,763,825 A | | 6/1998 | Gilliland |

* cited by examiner

*Primary Examiner*—Tuyen T. Nguyen
(74) *Attorney, Agent, or Firm*—Ohlandt, Greeley, Ruggiero & Perle, L.L.P.

(57) ABSTRACT

There is provided an inductive coupler for coupling a signal to a conductor. The inductive coupler includes (a) a magnetic core having an aperture through which the conductor is routed, (b) a winding wound around a portion of the magnetic core, where the signal is coupled between the winding and the conductor via the magnetic core, and (c) an electrically insulating, compressible material situated between the winding and the magnetic core, having a hardness of between about 10 and about 100 on a hardness type shore A durometer scale.

2 Claims, 4 Drawing Sheets

INDUCTIVE COUPLER FOR POWER LINE COMMUNICATIONS

CROSS-REFERENCE TO RELATED APPLICATIONS

The present application is a divisional of U.S. patent application Ser. No. 11/133,671, filed May 20, 2005.

BACKGROUND OF THE INVENTION

1. Field of the Invention

The present invention relates to power line communications, and more particularly, to a configuration of a data coupler for power line communications.

2. Description of the Related Art

Power line communications (PLC), also known as broadband over power line (BPL), is a technology that encompasses transmission of data at high frequencies through existing electric power lines, i.e., conductors used for carrying a power current. A data coupler for power line communications couples a data signal between a power line and a communication device such as a modem.

An example of such a data coupler is an inductive coupler that includes a set of cores, and a winding wound around a portion of the cores. The inductive coupler operates as a transformer, where the cores are situated on a power line such that the power line serves as a primary winding of the transformer, and the winding of the inductive coupler is a secondary winding of the transformer.

The cores are typically constructed with magnetic materials, such as ferrites, powdered metal, or nano-crystalline material. The cores are electrified by contact with the power line and require insulation from the secondary winding. Typically, insulation is provided between the cores and secondary winding by embedding both the cores and the secondary winding in electrically insulating material, such as epoxy. During a molding process, the electrically insulating material reaches an elevated temperature. As the electrically insulating material, in a liquid state, flows around the cores, it begins to cool and contract. The thermal coefficient of expansion of the electrically insulating material is typically much higher than that of the core, and consequently, stress cracking of the electrically insulating material may occur during a transition from liquid to solid state.

In field operation, stiffly held magnetic cores made of brittle material may crack due to vibration or thermal expansion. There is a need for an inductive coupler configured to avoid such cracking.

SUMMARY OF THE INVENTION

There is provided an inductive coupler for coupling a signal to a conductor. The inductive coupler includes (a) a magnetic core having an aperture through which the conductor is routed, (b) a winding wound around a portion of the magnetic core, where the signal is coupled between the winding and the conductor via the magnetic core, (c) an electrically insulating material situated between the winding and the magnetic core, having a hardness of between about 10 and about 100 on a hardness type shore A durometer scale.

DESCRIPTION OF THE INVENTION

In a PLC system, power current is typically transmitted through a power line at a frequency in the range of 50–60 hertz (Hz). In a low voltage line, power current is transmitted with a voltage between about 90 to 600 volts, and in a medium voltage line, power current is transmitted with a voltage between about 2,400 volts to 35,000 volts. The frequency of the data signals is greater than or equal to about 1 megahertz (MHz), and the voltage of the data signal ranges from a fraction of a volt to a few tens of volts.

Figure 1:
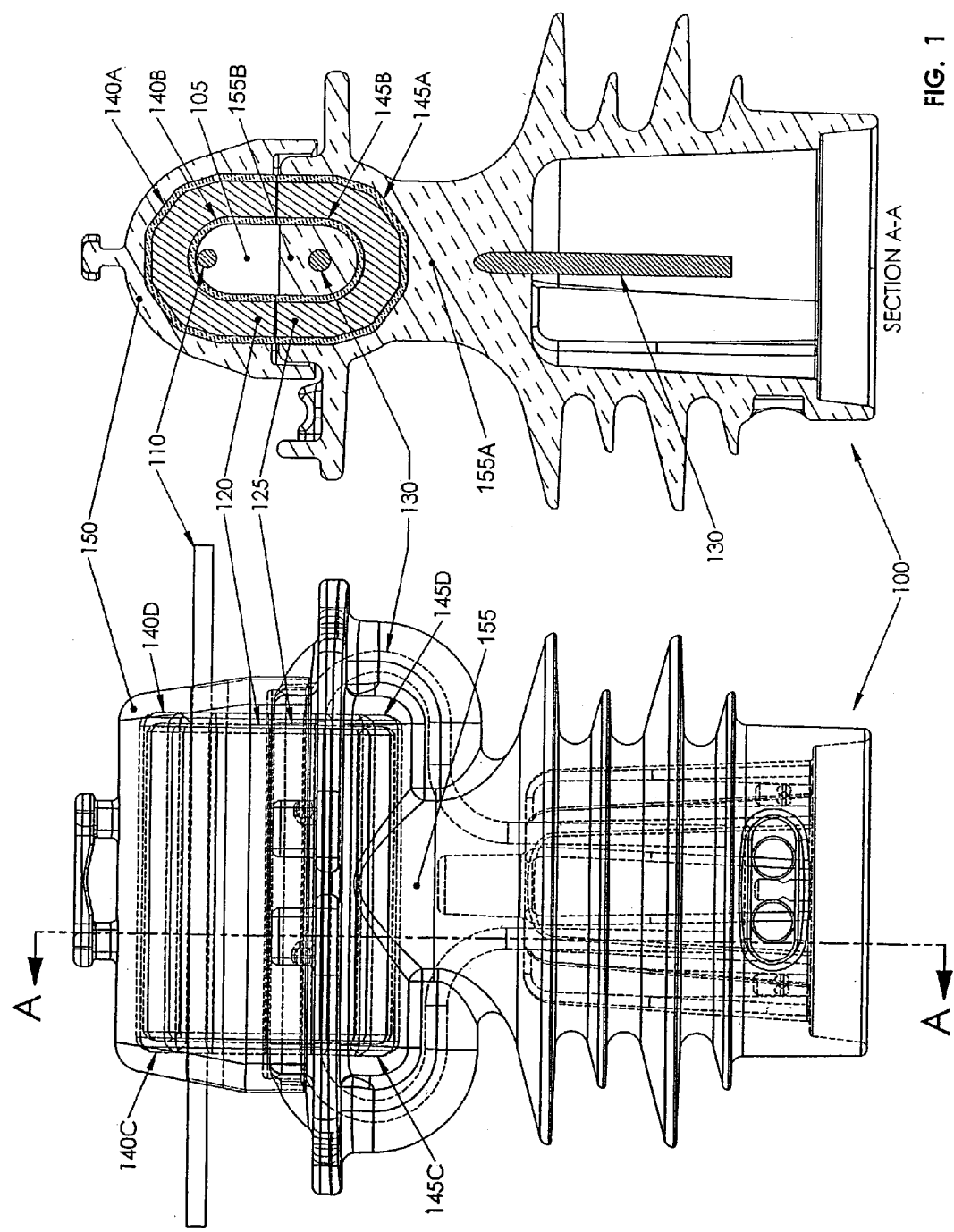
FIG. 1 is a front and cross-sectional view of an inductive coupler on a power line.

FIG. 1 is an illustration of a front view with internal components visible with dashed lines, and a cross-section view, of an inductive coupler 100 on a conductor, i.e., power line 110. Inductive coupler 100 has a split magnetic core configured of an upper core 120 and a lower core 125 that are shaped such that when they are placed adjacent to one another, they provide an aperture 105 through which power line 110 is routed. Inductive coupler 100 also has a winding 130 wound around a portion of lower core 125. Winding 130 is for connection with a modem or other communications equipment (not shown). In FIG. 1, winding 130 is shown as being wound once around lower core 125, but in practice, winding 130 may be wound two or more times. A data signal is coupled between winding 130 and power line 110 via the split magnetic core.

Upper core 120 is enveloped by a compressible material, configured as an inward layer 140B, an outward layer 140A, an end layer 140C and an end layer 140D. A layer 150 of an electrically insulating material is disposed over outward layer 140A, end layer 140C and end layer 140D.

Lower core 125 is enveloped by a compressible material, configured as an inward layer 145B, an outward layer 145A, an end layer 145C and an end layer 145D. A layer 155 of an electrically insulating material is molded into a three-dimensional shape and disposed over inward layer 145B, outward layer 145A, end layer 140C and end layer 140D. Layer 155 also envelopes the portion of winding 130 that is wound around core 125. In cross-sectional views of FIGS. 1–3, layer 155 is represented as having a portion 155A disposed over outward layer 145A, and a portion 155B disposed over inward layer 145B

The compressible material of inward layer 140B, outward layer 140A, end layer 140C and end layer 140D has a hardness that is less than that of the electrically insulating material of layer 150. Outward layer 140A, end layer 140C and end layer 140D compress as layer 150 cures, cools and contracts during a molding process. Such compression obviates cracking of layer 150 during a cooling phase. Furthermore, outward layer 140A, inward layer 140B, end layer 140C and end layer 140D provide an environmental seal for upper core 120.

The compressible material of outward layer 145A, inward layer 145B, end layer 145C and end layer 145D has a hardness that is less than that of the electrically insulating material of layer 155. Outward layer 145A, inward layer 145B, end layer 145C and end layer 145D compress as layer 155 cures, cools and contracts during a molding process. Such compression obviates cracking of layer 155 during a cooling phase. Outward layer 145A, inward layer 145B, end layer 145C and end layer 145D also provide an environmental seal for lower core 125.

The compressible material of outward layers 140A and 145A, inward layers 140B and 145B, and end layers 140C, 140D, 145C and 145D preferably has a hardness of between about 10 and about 100 on a hardness type shore A durometer scale. An example of such a material is Ethylene Propylene Diene Monomer (EPDM). Hardness testing procedures are provided by the American Society for Testing & Materials, ASTM D2240-03.

In practical operation, inductive coupler 100 may be subjected to a variety of temperatures and environmental conditions, for example, summer heat, winter cold, rain, snow and ice. Because of a difference between thermal coefficients of expansion of upper core 120 and layer 150, a gap may tend to develop between upper core 120 and layer 150. Water could accumulate in the gap, thereafter freezing and expanding, i.e., frost heave, further aggravating the gap, and resulting in cracks in both upper core 120 and layer 150. Such gaps and cracks in inductive coupler 100 could lead to electric discharge, causing radio frequency noise, which is detrimental to the operation of a power line communications system. Electric discharge may also cause a deterioration of the electrically insulating material of layer 150, over time, and may lead to insulation failure. Outward layer 140A, end layer 140C and end layer 140D seal such gaps and cracks, and thus reduce opportunities for discharges to occur. Additionally, outward layer 140A, inward layer 140B, end layer 140C and end layer 140D absorb physical shock and vibration that could damage upper core 120. Outward layer 145A, inward layer 145B, end layer 145C and end layer 145D provide similar benefits with regard to layer 155 and lower core 125.

The compressible material of outward layers 140A and 145A, inward layers 140B and 145B, and end layers 140C, 140D, 145C and 145D, also, preferably, has a semi-conductive electrical property. Thus, each of outward layers 140A and 145A, and inward layers 140B and 145B, when subjected to an electric charge, distribute the electrical charge over their respective volumes, and provide an equipotential volume. In a preferred implementation, a bulk resistivity of outward layers 140A and 145A, and inward layers 140B and 145B is between about 5 and about 1000 ohm-cm so that a voltage difference between upper core 120 and lower core 125 will not exceed 2% of a voltage on power line 110.

Outward layer 140A, inward layer 140B, end layer 140C and end layer 140D, are in physical and electrical contact with outward layer 145A, inward layer 145B, end layer 145C and end layer 145D. Upper core 120 and lower core 125 are thus connected to one another and are at a common electrical potential as one another, minimizing any potential difference that might cause an electrical discharge between upper core 120 and lower core 125. Outward layers 140A and 145A, inward layers 140B and 145B, and end layers 140C, 140D, 145C and 145D collectively form a semiconducting sheath that minimizes partial discharge or corona in inductive coupler 100.

Figure 2:
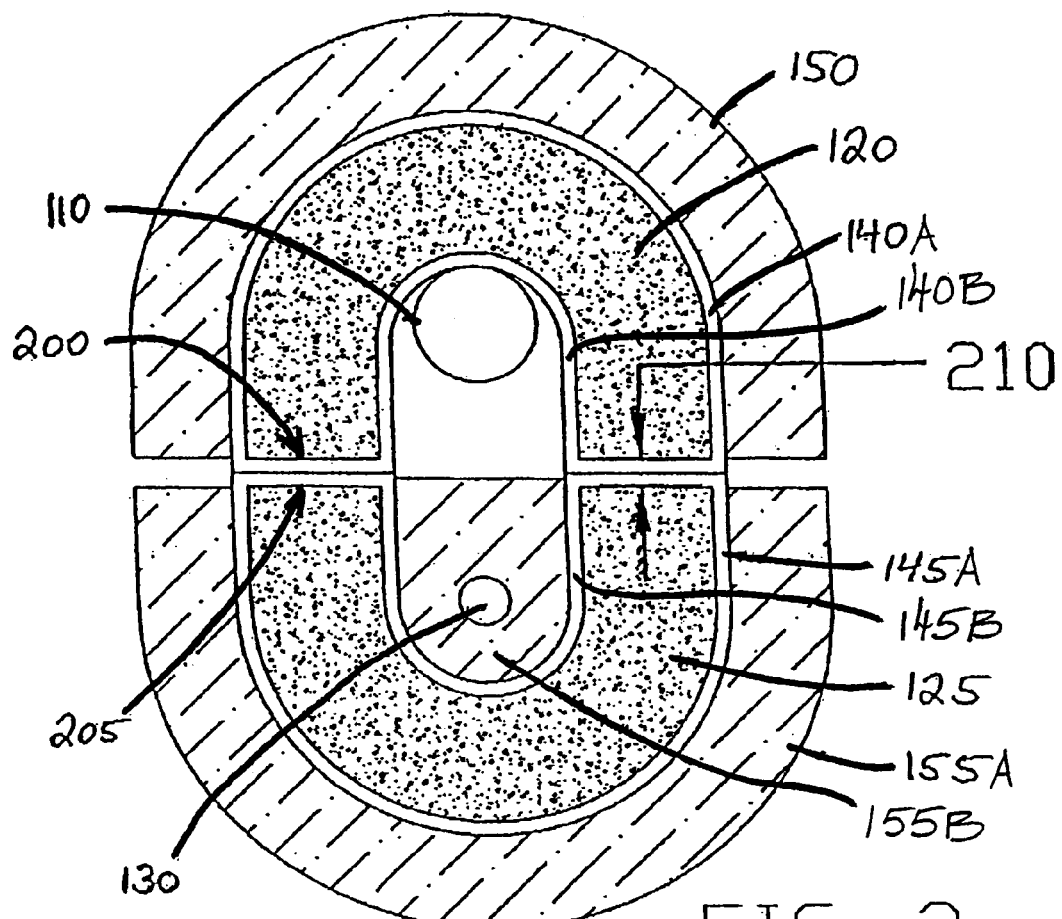
FIG. 2 is a cross-sectional view of an upper and a lower core of an inductive coupler, with compressible layers around the cores.

FIG. 2 is a cross-sectional view of an upper and a lower core of an inductive coupler, with compressible layers around the cores. Upper core 120 has a pole face 200 and lower core 125 has a pole face 205. Pole face 200 and pole face 205 are spaced apart from one another by an air gap 210.

The term "air gap" is a term of art that refers to a region, between magnetic cores, having non-magnetic material therein. Air gaps improve magnetic characteristics of a magnetic circuit at a high current level.

Outward layer 140A, inward layer 140B, and end layers 140C and 140D (not shown in FIG. 2) converge with one another and cover pole face 200. Outward layer 145A, inward layer 145B, and end layers 145C and 145D (not shown in FIG. 2) converge with one another and cover pole face 205. Thus, the layers provide a fill of non-magnetic material for air gap 210. This configuration of material in air gap 210 also cushions pole faces 200 and 205 from physical shock and vibration, to reduce an opportunity for fracturing of upper core 120 and lower core 125.

Figure 3:
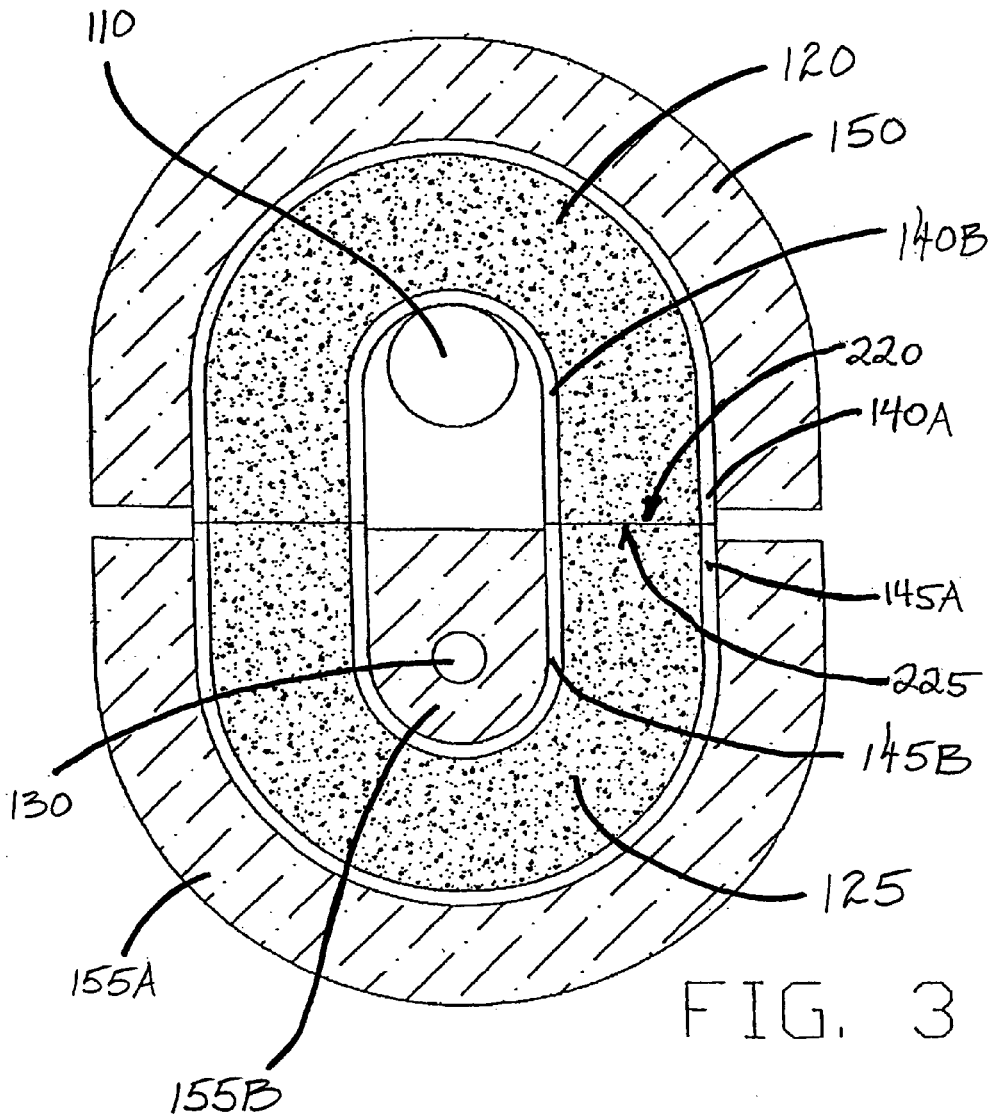
FIG. 3 is a cross-sectional view of an upper and a lower core of an inductive coupler with compressible layers that expose the core faces.

FIG. 3 is a cross-sectional view of an upper and a lower core of an inductive coupler with compressible layers that expose the core faces. Outward layers 140A and 145A, inward layers 140B and 145B, end layers 140C, 140D, 145C and 145D (not shown in FIG. 3) terminate at, and do not cover, pole face 220 and 225. However, outward layers 140A and 145A, inward layers 140B and 145B, and end layers 140C, 145C, 140D and 145D are in contact with one another. Thus, there is electrical continuity between outward layers 140A and 145A, inward layers 140B and 145B, and end layers 140C, 145C, 140D and 145D.

Figure 4:
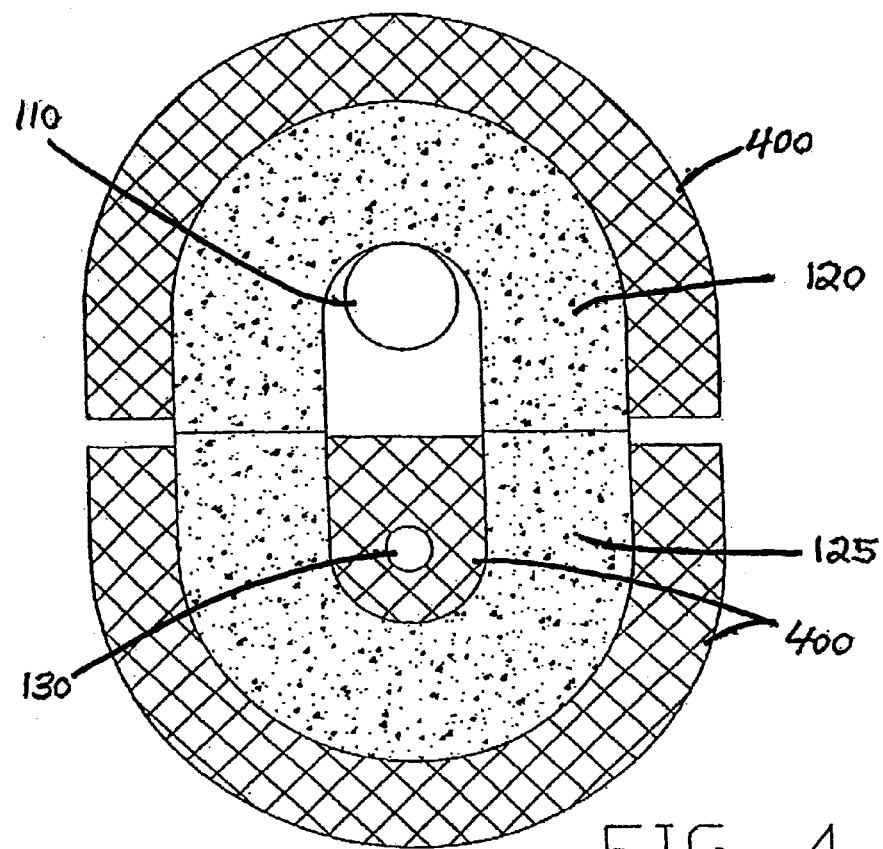
FIG. 4 is a cross-sectional view of an upper and a lower core of an inductive coupler, with insulation serving as a compressible layer around the cores.

FIG. 4 is a cross-sectional view of an upper and a lower core of an inductive coupler, with insulation serving as a compressible layer around the cores. A layer 400 is disposed on an outward surface of upper core 120, and disposed on an inward surface and an outward surface of lower core 125. Layer 400 is composed of a material that is both insulating and compressible. That is, layer 400 is an insulator and is also compressible for over-molding of upper core 120 and lower core 125. Preferably, layer 400 has a hardness of between about 10 and about 100 on a hardness type shore A durometer scale. Layer 400 can be composed of a silicone, for example.

The techniques described herein are exemplary, and should not be construed as implying any particular limitation on the present invention. It should be understood that various alternatives, combinations and modifications could be devised by those skilled in the art. The present invention is intended to embrace all such alternatives, modifications and variances that fall within the scope of the appended claims.

What is claimed is:

1. An inductive coupler for coupling a signal to a conductor, comprising:
    a magnetic core having an aperture through which said conductor is routed;
    a winding wound around a portion of said magnetic core, wherein said signal is coupled between said winding and said conductor via said magnetic core; and
    an electrically insulating compressible material situated between said winding and said magnetic core, having a hardness of between about 10 and about 100 on a hardness type shore A durometer scale.

2. The inductive coupler of claim 1, further comprising an electrically insulating material on an outward surface of said magnetic core, having a hardness of between about 10 and about 100 on a hardness type shore A durometer scale.

* * * * *